United States Patent
Nakazawa et al.

(10) Patent No.: US 11,065,801 B2
(45) Date of Patent: Jul. 20, 2021

(54) INJECTION STRETCH BLOW MOLDING MACHINE AND METHOD FOR MANUFACTURING HOLLOW MOLDED BODY

(71) Applicant: Aoki Technical Laboratory, Inc., Nagano (JP)

(72) Inventors: Nobuhiko Nakazawa, Nagano (JP); Miwa Terada, Nagano (JP)

(73) Assignee: Aoki Technical Laboratory, Inc., Nagano (JP)

( * ) Notice: Subject to any disclaimer, the term of this patent is extended or adjusted under 35 U.S.C. 154(b) by 105 days.

(21) Appl. No.: 16/609,640

(22) PCT Filed: Jan. 31, 2019

(86) PCT No.: PCT/JP2019/003321
§ 371 (c)(1),
(2) Date: Oct. 30, 2019

(87) PCT Pub. No.: WO2019/202811
PCT Pub. Date: Oct. 24, 2019

(65) Prior Publication Data
US 2020/0147853 A1 May 14, 2020

(30) Foreign Application Priority Data

Apr. 19, 2018 (JP) .............................. JP2018-080688

(51) Int. Cl.
*B29C 49/06* (2006.01)
*B29C 49/36* (2006.01)
(Continued)

(52) U.S. Cl.
CPC .............. *B29C 49/06* (2013.01); *B29C 49/12* (2013.01); *B29C 49/36* (2013.01); *B29C 49/66* (2013.01);
(Continued)

(58) Field of Classification Search
CPC .......... B29C 49/66; B29C 49/36; B29C 49/70; B29C 2049/701; B29C 2049/023; B29C 49/06
See application file for complete search history.

(56) References Cited

U.S. PATENT DOCUMENTS

| | | | | |
|---|---|---|---|---|
| 3,884,610 A | * | 5/1975 | Mehnert | B29C 49/00 425/535 |
| 5,308,237 A | * | 5/1994 | Kieran | B29C 33/46 294/188 |
| 6,450,795 B1 | * | 9/2002 | Fields | B29C 49/70 425/182 |

(Continued)

FOREIGN PATENT DOCUMENTS

| | | |
|---|---|---|
| JP | 372419 U | 7/1991 |
| JP | 4219222 A | 8/1992 |

(Continued)

OTHER PUBLICATIONS

Extended European Search Report dated Dec. 22, 2020, for corresponding European Applicatin No. 19789061.9; consisting of 6-pages.

(Continued)

*Primary Examiner* — Robert B Davis
(74) *Attorney, Agent, or Firm* — Christopher & Weisberg, P.A.

(57) ABSTRACT

Fixation of a container shape of a hollow molded body is not completed during a blow molding process but is completed during an ejection process of an ejection section, thereby shortening an operation time in a stretch blow molding section, and improving the production efficiency of hollow molded bodies by shortening the time required for the blow molding process during a molding cycle.

Cooling air is blown into the inside of the hollow molded body disposed in the ejection section in the ejection process C during the blow molding process B in the next molding (Continued)

cycle to cool the hollow molded body disposed in the ejection section to solidify the container shape.

4 Claims, 13 Drawing Sheets

(51) Int. Cl.
  *B29C 49/66* (2006.01)
  *B29C 49/70* (2006.01)
  *B29C 49/12* (2006.01)
  *B29C 49/02* (2006.01)
  *B29L 31/00* (2006.01)

(52) U.S. Cl.
  CPC ........ *B29C 49/70* (2013.01); *B29C 2049/023* (2013.01); *B29C 2049/701* (2013.01); *B29L 2031/712* (2013.01)

(56) References Cited

U.S. PATENT DOCUMENTS

2009/0274789 A1* 11/2009 Kobayashi .......... B29C 45/1769
                                                          425/533
2018/0079122 A1    3/2018  Aoki et al.
2018/0079127 A1    3/2018  Aoki
2019/0061222 A1    2/2019  Usami et al.

FOREIGN PATENT DOCUMENTS

| | | |
|---|---|---|
| JP | H0568630 A | 3/1993 |
| JP | 568630 U | 9/1993 |
| JP | 2000343590 A | 12/2000 |
| JP | 2017109472 A | 6/2017 |
| WO | 2012111728 A1 | 8/2012 |
| WO | 2017073685 A1 | 5/2017 |
| WO | 2017098673 A1 | 6/2017 |
| WO | WO-2018134772 A1 * | 7/2018 ............. B29C 49/80 |

OTHER PUBLICATIONS

International Search Report and Written Opinion dated Apr. 2, 2019, for corresponding International Application No. PCT/JP2019/003321 filed on Jan. 31, 2019; consisting of 9-pages.

* cited by examiner (INFLATING STAGE)

(HOLDING STAGE)

INJECTION STRETCH BLOW MOLDING MACHINE AND METHOD FOR MANUFACTURING HOLLOW MOLDED BODY

CROSS-REFERENCE TO RELATED APPLICATIONS:

This application is a Submission under 35 U.S.C. § 371 for U.S. National Stage Patent Application of, and claims priority to, International Application Number PCT/JP2019/003321, entitled INJECTION STRETCH BLOW MOLDING MACHINE AND METHOD FOR MANUFACTURING HOLLOW MOLDED BODY, filed Jan. 31, 2019, which International Application is related to and claims priority to Japanese Application No. 2018-080688 filed Apr. 19, 2018, the entirety of all of which are incorporated herein by reference.

FIELD

The present invention relates to an injection stretch blow molding machine for manufacturing a hollow molded body in a molding cycle consisting of three processes configured in a single molding machine, and a method for manufacturing a hollow molded body by the injection stretch blow molding machine.

BACKGROUND

Injection Stretch Blow Molding Machine:

Conventionally, injection stretch blow molding machines have been used in the manufacture of hollow molded bodies having a container shape made of a synthetic resin. FIGS. 6, 7, and 8 show an example of a conventional injection stretch blow molding machine. This injection stretch blow molding machine 1 includes three stations including: an injection molding section 2 to which an injection machine a is connected and into which a molten resin is fed; a stretch blow molding section 3 configured to blow-mold a preform, having been injection-molded by the injection molding section 2, as a hollow molded body in a container shape; and an ejection section 4 configured to carry out the hollow molded body, having been blow-molded by the stretch blow molding section 3, to the outside of the machine.

Rotating Plate:

In the above-mentioned injection stretch blow molding machine 1, the three stations are disposed at the same circumferential position and at equal angular intervals. The injection stretch blow molding machine 1 includes an intermediate base 6 and a rotating plate 5 inside the intermediate base 6 and above the three stations. The rotating plate 5 is configured to convey molded preforms and hollow molded bodies in a pivoting manner.

Lip Mold:

The above-described rotating plate 5 of the injection stretch blow molding machine 1 has, on the lower surface thereof, lip molds 7 for forming the outer peripheral surface of the mouth portion of a preform and for conveying the preform. Specifically, the lip molds 7 are configured to form the outer peripheral surface of the mouth portion of a preform and to convey the preform while griping the mouth portion of the molded preform as well as the hollow molded body which has been molded to have the container shape.

Constant Angle Rotation of Rotating Plate:

In the injection stretch blow molding machine 1, as shown in Patent Literature 1 and FIG. 9, the injection molding section 2, the stretch blow molding section 3, and the ejection section 4 are provided at equal angular intervals (120 degrees) around the rotation center axis of the rotating plate 5. A rotating plate section 8 formed by assembling a control device, a drive motor, and the like to the intermediate base 6 supports the rotating plate 5. Under the control of the rotating plate section 8, the rotating plate 5 stops every rotation at a constant rotation angle (120 degrees), and the rotating plate in a state in which the rotation is stopped ascends and descends together with the rotating plate section 8.

Injection Molding Section:

Each time the rotating plate 5 descends, the lip molds 7 on the lower surface of the rotating plate 5 correspond to the injection molding section 2, the stretch blow molding section 3, and the ejection section 4, and in the injection molding section 2, the lip mold 7 descends, whereby an injection molding mold 9 is formed by a mold disposed in the injection molding section 2 and the lip mold 7. In the stretch blow molding section 3, by the lip mold 7 descending, the stretch blow molding mold is formed by a mold disposed in the stretch blow molding section 3 and the lip mold 7.

In FIG. 6, in order to facilitate understanding of the structure of the injection stretch blow molding machine 1, a cavity mold and a core mold of the injection molding mold 9 are not shown. FIG. 7 shows a state in which the injection molding mold 9 is opened at the injection molding section 2, and thus a core mold 11 ascends toward an upper base 10, and a cavity mold 13 is positioned on the side of a lower base 12.

The lip mold 7 forms the shape of the outer peripheral surface of the preform mouth portion as a part of the injection molding mold 9, and holds the preform which has been injection molded and is in a soft state at a high temperature and conveys the preform to the stretch blow molding section 3.

Stretch Blow Molding Section:

In the stretch blow molding section 3, as shown in FIG. 6, split molds are formed in a blow mold clamping unit 14, and a stretching unit 15 for stretching a preform is assembled to the intermediate base 6 so as to be positioned above the stretch blow molding section 3. The lip mold 7 corresponds to the stretch blow molding section 3 to form a blow molding mold 16.

The stretch blow molding section 3 is located downstream of the injection molding section 2 in the direction of rotation of the rotating plate, and is the molding stage next to the injection molding section 2. The lip mold 7 corresponding to the stretch blow molding section 3 can position the preform in the blow molding mold, and as shown in FIG. 10, the operation of the stretching unit 15 and blowing of blow air c can achieve blow molding of the preform into a hollow molded body in a container shape.

The hollow molded body having been blow-molded remains held by the lip mold 7, and this lip mold 7 conveys the hollow molded body to the ejection section 4 of the next stage. When the lip mold 7 corresponds to the ejection section 4, the hollow molded body is positioned in the ejection section 4.

Ejection Section:

In the ejection section 4, a not-illustrated slope is disposed on the side of the lower base 12. Then, the hollow molded body released from the lip mold corresponding to the ejection section 4 is guided by the slope so as to be transferred to the outside of the injection stretch blow molding machine 1. FIG. 8 shows the injection stretch blow molding machine 1 as seen from the side of the ejection section 4, and the blow mold clamping unit 14 of the stretch blow molding section 3 is located on the back side in the drawing.

A mechanism for pushing the hollow molded body toward the slope is formed above the slope in the ejection section 4. As shown in FIGS. 6 and 8, a takeout unit 17 is disposed on the side of the intermediate base 6 at a position corresponding to the ejection section 4, and a plurality of rods 18 for pushing out the hollow molded bodies positioned at the ejection section 4 by the lip mold 7 are guided by the takeout unit 17 so as to ascend and descend.

On the other hand, as shown in FIG. 11, the lip mold 7 disposed on the rotating plate 5 is formed by combining a pair of halves and can be divided into two. Furthermore, the rods 18 are provided to open the lip mold 7 just before, for example, coming down into contact with the mouth portions of the hollow molded bodies. Thus, the rods 18 come into contact with the hollow molded bodies released from the holding of the lip mold 7 so that the hollow molded bodies are to be pushed out toward the slope, whereby the hollow molded bodies are pushed out of the machine from the slope.

The lip mold 7 is configured to be closed again when the rods 18 ascend to the standby position. After that, the lip mold 7 moves to the injection molding section 2 by the rotation of the rotating plate 5. It should be noted that when the lip mold 7 moves from the injection molding section 2 to the stretch blow molding section 3, moves from the stretch blow molding section 3 to the ejection section 4, and moves from the ejection section 4 to the injection molding section 2, the rotating plate 5 ascends and descends together with the rotating plate section 8 (intermediate base 6).

Molding Cycle:

The conventional injection stretch blow molding machine includes a molding cycle in which an injection molding process, a blow molding process, and an ejection process proceed in this order, and the hollow molded body is manufactured through the molding cycle. (Each process is an operation of the molding machine.)

Injection Molding Process:

First, in the injection molding process, as described above, the lip mold 7 corresponds to the injection molding section 2 and the resin is fed from the injection machine into the injection molding mold 9 having been constituted at the injection molding section 2, so that preforms are injection-molded with the injection molding mold 9.

Blow Molding Process:

The blow molding process is performed by a blow molding mold 16 which is constituted at the stretch blow molding section 3 by the lip mold 2 corresponding to the stretch blow molding section 3. Specifically, the lip mold 7 holding the high-temperature, soft preforms that have been injection molded in the injection molding section 2 moves and corresponds to the stretch blow molding section 3, and this corresponding lip mold can place the preforms in the blow molding mold 16 in the stretch blow molding section 3. Then, the preforms are stretched by the rods of the stretching unit 15, while blow air c is blown into the preforms. As a result, hollow molded bodies in a container shape are blow molded.

Ejection Process:

In the ejection process subsequent to the blow molding process, the lip mold 7 holding the hollow molded bodies having been blow molded as described above moves and corresponds to the ejection section 4, and the hollow molded bodies are disposed in the ejection section 4 by the lip mold 7 corresponding to the ejection section 4. Then, the lip mold 7 is opened to release the holding of the mouth portions of the hollow molded bodies. Further, the rods 18 guided by the takeout unit 17 and moving down from above come to abut against the mouth portions of the hollow molded bodies and push the same, so that the hollow molded bodies are detached from the lip mold 7 and transferred to the slope.

In the above-mentioned injection stretch blow molding machine for manufacturing a hollow molded body by the molding cycle in which the above-mentioned processes proceed sequentially, the process progress in the above-mentioned molding cycle is shifted by one step with respect to the process progress in a molding cycle next to the molding cycle, so that the hollow molded body is manufactured for each molding cycle. (See FIG. 12)

CITATION LIST

Patent Literature

Patent Literature 1: Japanese Patent Application Laid-Open No. 2017-109472

SUMMARY

Technical Problem

FIG. 12 schematically shows the progress of the three processes when the injection stretch blow molding machine described above is in operation. As described above, since the injection molding process, the blow molding process, and the ejection process proceed in this order in the molding cycle, the process progress in one molding cycle is described in FIG. 12 in a lateral direction (X-axis direction) in this order. That is, the injection molding process A, the blow molding process B, and the ejection process C are described in this order. In FIG. 12, a portion denoted by a symbol r indicates a stage at which the rotating plate ascends, the rotating plate is rotated (by 120 degrees), and the rotating plate descends.

In the above-mentioned injection stretch blow molding machine, a molding cycle is shifted by one step with respect to the process progress in a molding cycle next to the molding cycle. That is, the injection stretch blow molding machine is configured such that the process progress of one molding cycle precedes with respect to the process progress of the next molding cycle by one step. Three molding cycles (1), (2), and (3) are shown in a preceding order in the vertical direction (Y-axis direction) in FIG. 12. FIG. 12 shows the state in which the process progress of the preceding molding cycle precedes by one step with respect to the next molding cycle.

In FIG. 12, three molding cycles are shown for ease of explanation. Of course, in the operation of the injection stretch blow molding machine, the fourth and subsequent molding cycles are also continued.

Further, in the above-mentioned injection stretch blow molding machine, as shown in FIG. 9, there are the injection molding section, the stretch blow molding section, and the ejection section at an angular interval of 120 degrees on the lower base. In addition, a plurality of lip molds are separately disposed on one rotating plate at an angular interval of 120 degrees so as to correspond to the injection molding section, the stretch blow molding section, and the ejection section. When the rotating plate stops and descends at every rotation of a fixed rotation angle (120 degrees), the lip molds are positioned in the injection molding section, the stretch blow molding section, and the ejection section, respectively.

When the processes in the injection molding section, the stretch blow molding section, and the ejection section are completed, the rotating plate ascends again and rotates 120 degrees toward the downstream side in the rotation direction of the rotating plate.

As described above, when the single rotating plate descends and stays there, the injection molding process is performed in the injection molding section, the blow molding is performed in the stretch blow molding section, and the ejection process is performed in the ejection section. Thus, the time during which the rotating plate itself descends and is stopped is the same as that in any of the injection molding process, the blow molding process, and the ejection process.

Operation in Stretch Blow Molding Section:

In the stretch blow molding section of the conventional injection stretch blow molding machine, the rods of the stretching unit enter the respective preforms and press down the bottoms of the preforms to perform stretching, and blow molding is simultaneously performed by blowing blow air set at a predetermined temperature into the preforms.

Inflating Stage (Third Blowing):

In the blow molding performed in the blow molding process B, as shown in FIG. 12, there are an inflating stage d and a holding stage e which is continuous with the inflating stage d. The inflating stage d is referred to as third blowing, and is a stage in which a preform is inflated in a three-dimensional direction in a blow molding mold by blowing of blow air c, and the inflated preform is brought into contact with the mold surface of the blow molding mold, so that the preform is changed in shape and formed into a hollow molded body in a container shape. FIG. 13 shows an inflating stage in which the shape of the preform changes.

Holding Stage (Cooling Blow):

The holding stage e is referred to as a cooling blow, and is a stage of continuing blowing of the blow air c subsequent to the inflating stage d and holding the hollow molded body with the blow molding mold. In the holding stage e, the blow air c is blown and the hollow molded body is cooled until the container shape is solidified, so that solidification of the container shape is completed in the holding stage e. FIG. 14 shows the holding stage.

Since the solidification of the hollow molded body is completed in the holding stage e, even if the hollow molded body is conveyed from the stretch blow molding section to the ejection section and drops onto the slope in the ejection section, the hollow molded body does not collapse or is not deformed.

In the stretch blow molding section, the blow air is blown as described above while the hollow molded body is cooled to become a temperature at which the container shape is solidified. Then, the time during which a rotating body needs to descend and be stopped in the blow molding process is determined on the basis of the main condition that the fixation of the container shape of the hollow molded body is completed.

Operation in Injection Molding Section:

On the other hand, in the injection molding section in the above-mentioned injection stretch blow molding machine, a resin is injected into the injection molding mold from the injection machine connected to a hot runner portion (i.e., a runner leading to the cavity mold of the injection molding section). Cooling is performed until the preforms can be released properly and are stabilized in a preform shape which is not deformed when being conveyed to the above-mentioned stretch blow molding section disposed downstream in the rotation direction of the rotating plate. Injection of the resin into the injection molding mold and cooling of the preforms in the injection molding mold are performed as main operations in the above-mentioned injection molding process. In FIG. 12, the injection cooling stage of the preforms is indicated by the symbol f.

Operation in Ejection Section:

In the ejection section, as described above, the lip mold that holds the mouth portions of the hollow molded bodies is opened, and the hollow molded bodies are dropped toward the slope by the rods of the takeout unit. During the ejection process, the lip mold is opened, the hollow molded bodies are pushed off by the rods, and then, the lip mold is closed.

Problematic Matter:

However, in the case of manufacturing the hollow molded body using the above-mentioned conventional injection stretch blow molding machine, when the followings are compared with each other, the time required to complete the fixation of the container shape in the stretch blow molding section, the total time (excluding the time for the injection operation of the injection machine) of the time required for the resin to spread in the mold and the time required for the preform to cool in the injection molding section, and the actual operation time involved in the opening and closing of the lip mold and the ascending and descending of the rods in the ejection section, the time required to complete the fixation of the container shape in the stretch blow molding section has become the longest. It should be noted that the actual operation time involved in the opening and closing of the lip mold and the ascending and descending of the rod in the ejection section is short.

As described above, in all of the injection molding process, the blow molding process, and the ejection process of the molding cycle, the time during which the rotating plate itself descends and is stopped is the same. The time required for the blow molding process in the stretch blow molding section is the longest, and therefore, there is a problem in that the time allocated to the injection molding process, the time allocated to the blow molding process, and the time allocated to the ejection process are the same as the longest time allocated to the blow molding process during the molding cycle.

For example, the operation of each device of the injection molding section and the operation of the injection machine in the injection molding process must be adjusted to comply with the time requirement specified in the blow molding process. In particular, in order to smoothly move the preform, which is in a soft state even though the preform shape is stable, from the injection molding section into the blow molding mold of the stretch blow molding section, adjustment must be made to lengthen the operation time before the injection machine performs an injection operation.

Further, in recent years, an attempt has been made to shorten the operation time in the injection molding section by devising to release the preform from the injection molding mold at an early stage, thereby shortening the molding cycle.

However, since the time allocated to the injection molding process is the same as the time required for the blow molding process, even if an attempt has been made to release the preform at an early stage in the injection molding section, adjustment for lengthening the operation time before the injection operation by the injection machine is necessary. Therefore, it is impossible to utilize the advantage of releasing the preform at an early stage.

The present inventor has focused on the points that the actual operation time involved with the opening and closing of the lip mold and the ascending and descending of the rod is short in the ejection section configured on the downstream side in the rotation direction of the rotating plate with respect to the stretch blow molding section, and that the operation timing of the opening and closing of the lip mold and the ascending and descending of the rod can be easily set during the ejection process without affecting the operation of the devices in the injection molding section or the operation of the devices in the stretch blow molding section.

In view of the above-described circumstances, problems to be solved are not to complete the fixation of the container shape of the hollow molded body during the blow molding process but to complete the fixation during the ejection process of the ejection section, thereby shortening the operation time in the stretch blow molding section, and an object of the present invention is to improve the production efficiency of hollow molded bodies by shortening the time required for the blow molding process during the molding cycle.

Solution to Problem

The present invention has been made in consideration of the above-mentioned problems, and is an injection stretch blow molding machine in which an injection molding section, a stretch blow molding section, and an ejection section are provided around a rotation center axis of a rotating plate below the rotating plate having a lower surface to which lip molds for forming an outer peripheral surface of a mouth portion of a preform and for conveying a preform, the rotating plate being configured to stop at every constant rotation angle and ascend and descend, the lip molds corresponding to the injection molding section, the stretch blow molding section, and the ejection section every time the rotating plate rotates at the constant rotation angle and descends, the injection stretch blow molding machine having a molding cycle including:

an injection molding process in which the preform is injection molded in the injection molding section corresponding to the lip mold, a blow molding process in which the lip mold holding a high-temperature, soft preform having been injection molded in the injection molding section moves and corresponds to the stretch blow molding section, the lip mold corresponding to the stretch blow molding section disposes the preform in the stretch blow molding section, and a hollow molded body in a container shape is blow-molded by blowing blow air into the preform, and an ejection process in which the lip mold holding the hollow molded body having been blow-molded in the stretch blow molding section moves and corresponds to the ejection section, the lip mold corresponding to the ejection section disposes the hollow molded body in the ejection section, and the lip mold corresponding to the ejection section opens to release the hollow molded body therefrom, which processes are sequentially performed, the process progress in the molding cycle being shifted by one step from a process progress in a molding cycle next to the molding cycle to manufacture the hollow molded body every molding cycle. In this injection stretch blow molding machine, a cooling device capable of blowing cooling air during the blow molding process in the next molding cycle into the inside of the hollow molded body which is disposed in the ejection section and whose mouth portion is held by the lip mold is provided, and the cooling device is configured to blow cooling air into the inside of the hollow molded body disposed in the ejection section during the blow molding process in the next molding cycle to cool the hollow molded body disposed in the ejection section to complete fixation of a container shape. As a result, the above-described problems have been solved.

In the above-described invention, it is preferable that:

the blow molding of the stretch blow molding section may include an inflating stage of inflating the preform by blowing blow air to form a hollow molded body in a container shape, and a holding stage of holding the hollow molded body subsequent to the inflating stage, and the stretch blow molding section may cool the hollow molded body as a pretreatment of the cooling of the hollow molded body by the cooling device in the holding stage in the blow molding.

Further, in the above-described invention, it is preferable that the above-described ejection section may be provided with a pushing mechanism body, the pushing mechanism body may have a rod movable in a vertical direction corresponding to the mouth portion of the hollow molded body disposed in the ejection section, the movement range of the lower end of the rod may be set to a range from above the hollow molded body disposed in the ejection section through the position of the mouth portion of the hollow molded body to the inside of the hollow molded body, when the lower end of the rod reaches the position of the mouth portion of the hollow molded body from above the hollow molded body, the descending of the rod may be temporarily stopped, the lip mold may be opened to release the holding of the mouth portion of the hollow molded body by the lip mold at the time of descending of the rod after the temporal stop, and the hollow molded body whose holding by the lip mold is released may be pushed downward, the rod of the pushing mechanism body may be provided with a passage through which cooling air of the cooling device passes with a blow-out port located at the lower end of the rod, and the cooling device may blow cooling air from the blow-out port to the inside of the hollow molded body at the latest by the temporal stop of the descending rod.

Another aspect of the present invention is a method for manufacturing a hollow molded body by an injection stretch molding machine in which an injection molding section, a stretch blow molding section, and an ejection section are provided around a rotation center axis of a rotating plate below the rotating plate having a lower surface to which lip molds for forming an outer peripheral surface of a mouth portion of a preform and for conveying a preform, the rotating plate being configured to stop at every constant rotation angle and ascend and descend, the lip molds corresponding to the injection molding section, the stretch blow molding section, and the ejection section every time the rotating plate rotates at the constant rotation angle and descends, so that an injection molding mold is formed in the injection molding section by a mold provided in the injection molding section and a lip mold and a blow molding mold is formed in the stretch blow molding section by a mold provided in the stretch blow molding section and a lip mold, the injection stretch blow molding machine having a molding cycle including:

an injection molding process in which the preform is injection molded in the injection molding section corresponding to the lip mold, a blow molding process in which the lip mold holding a high-temperature, soft preform having been injection molded in the injection molding section moves and corresponds to the stretch blow molding section, the lip mold corresponding to the stretch blow molding section disposes the preform in the stretch blow molding section, and a hollow molded body in a container shape is blow-molded by blowing blow air into the preform, an ejection process in which the lip mold holding the hollow molded body having been blow-molded in the stretch blow molding section moves and corresponds to the ejection section, the lip mold corresponding to the ejection section disposes the hollow molded body in the ejection section, and the lip mold corresponding to the ejection section opens to release the hollow molded body therefrom, which processes are sequentially performed, the process progress in the molding cycle being shifted by one step from a process progress in a molding cycle next to the molding cycle. In this method for manufacturing a hollow molded body using this injection stretch blow molding machine, the injection stretch blow molding machine has a cooling device capable of blowing cooling air into the inside of the hollow molded body which is disposed in the ejection section and whose mouth portion is held by the lip mold, and the cooling device blows cooling air into the inside of the hollow molded body disposed in the ejection section during a blow molding process in the next molding cycle to cool the hollow molded body to solidify the container shape of the hollow molded body. As a result, the above-described problems have been solved.

In the above-described invention, it is preferable that:

the blow molding process may include an inflating stage of inflating the preform within the mold of the blow molding mold by blowing blow air to form a hollow molded body in a container shape, and a holding stage of holding the hollow molded body in the blow molding mold subsequent to the inflating stage, the molding cycle may be provided with a solidification period of solidifying the container shape in the hollow molded body from the holding stage in the blow molding process to the ejection process in the molding cycle, and in the holding stage in the solidification period, blow air may be blown into the hollow molded body held by the blow molding mold to cool the hollow molded body, and in the ejection process in the solidification period, cooling air of the cooling device may be blown into the hollow molded body disposed in the ejection section to cool the hollow molded body, thereby completing solidification of the hollow molded body in the solidification period.

Advantageous Effects of Invention

Effects of Invention:

According to the invention, the injection stretch blow molding machine has the cooling device capable of blowing cooling air into the inside of the hollow molded body disposed in the ejection section during the blow molding process in the next molding cycle, and the cooling device blows cooling air into the inside of the hollow molded body during the blow molding process in the next molding cycle to cool the hollow molded body and complete the fixation of the container shape. Thus, the operation time in the stretch blow molding section can be shortened.

As the operation time in the stretch blow molding section is shortened, the time allocated to the blow molding process in the molding cycle is shortened. Since the time allocated to the injection molding process and the time allocated to the ejection process of the molding cycle in the present injection stretch blow molding machine are the same as the time allocated to the blow molding process, the effect of shortening the molding cycle can be achieved.

Further, since the blow air of the stretch blow molding section and the cooling air from the cooling device can be made different from each other, the effect that the degree of freedom in setting the temperature and pressure of the cooling air to be fed from the cooling device is high can be achieved.

Effects of Invention:

According to the invention, since the stretch blow molding section cools the hollow molded body as a pre-treatment of cooling for completing fixation on the hollow molded body by the cooling device in the holding stage in blow molding, the effect of further facilitating securement of time for fixing the container shape during the molding cycle can be achieved.

Effects of Invention:

According to the invention, the rod of the pushing mechanism body is provided with a passage through which the cooling air of the cooling device passes with the blow-out port which is the terminal end of the flow passage of cooling air in the passage and located at the lower end of the rod, and the cooling device blows the cooling air from the blow-out port to the inside of the hollow molded body at the latest by the temporal stop of the descending rod. Therefore, the rod of the pushing mechanism body also serves as a pipe member for guiding cooling air of the cooling device to the hollow molded body, and it is not necessary to attach a pipe member for cooling air around the rod.

Effects of Invention:

According to the invention, since the cooling device of the injection stretch blow molding machine blows the cooling air into the inside of the hollow molded body during the blow molding process in the next molding cycle to cool the hollow molded body and complete the fixation of the container shape, it is possible to shorten the operation time in the stretch blow molding section.

As the operation time in the stretch blow molding section is shortened, the time allocated to the blow molding process during the molding cycle is shortened. Since the time allocated to the injection molding process and the time allocated to the ejection process of the molding cycle for manufacturing a hollow molded body are the same as the time allocated to the blow molding process, the effect of shortening the molding cycle can be achieved.

Effects of invention:

According to the invention, the molding cycle is provided with the solidification period for solidifying the container shape in the hollow molded body from the holding stage in the blow molding process to the ejection process in the molding cycle. Then, in the holding stage in the solidification period, blow air is blown into the hollow molded body held by the blow molding mold to cool the hollow molded body, and in the ejection process in the solidification period, cooling air of the cooling device is blown into the hollow molded body disposed in the ejection section to cool the hollow molded body, thereby completing solidification of the hollow molded body in the solidification period.

As described above, the hollow molded body is cooled to complete solidification both in the holding stage during the blow molding process in the blow molding section and in the ejection process in the ejection section, the effect of further facilitating securement of time for fixing the container shape during the molding cycle can be achieved.

DESCRIPTION OF EMBODIMENTS

Figure 1:
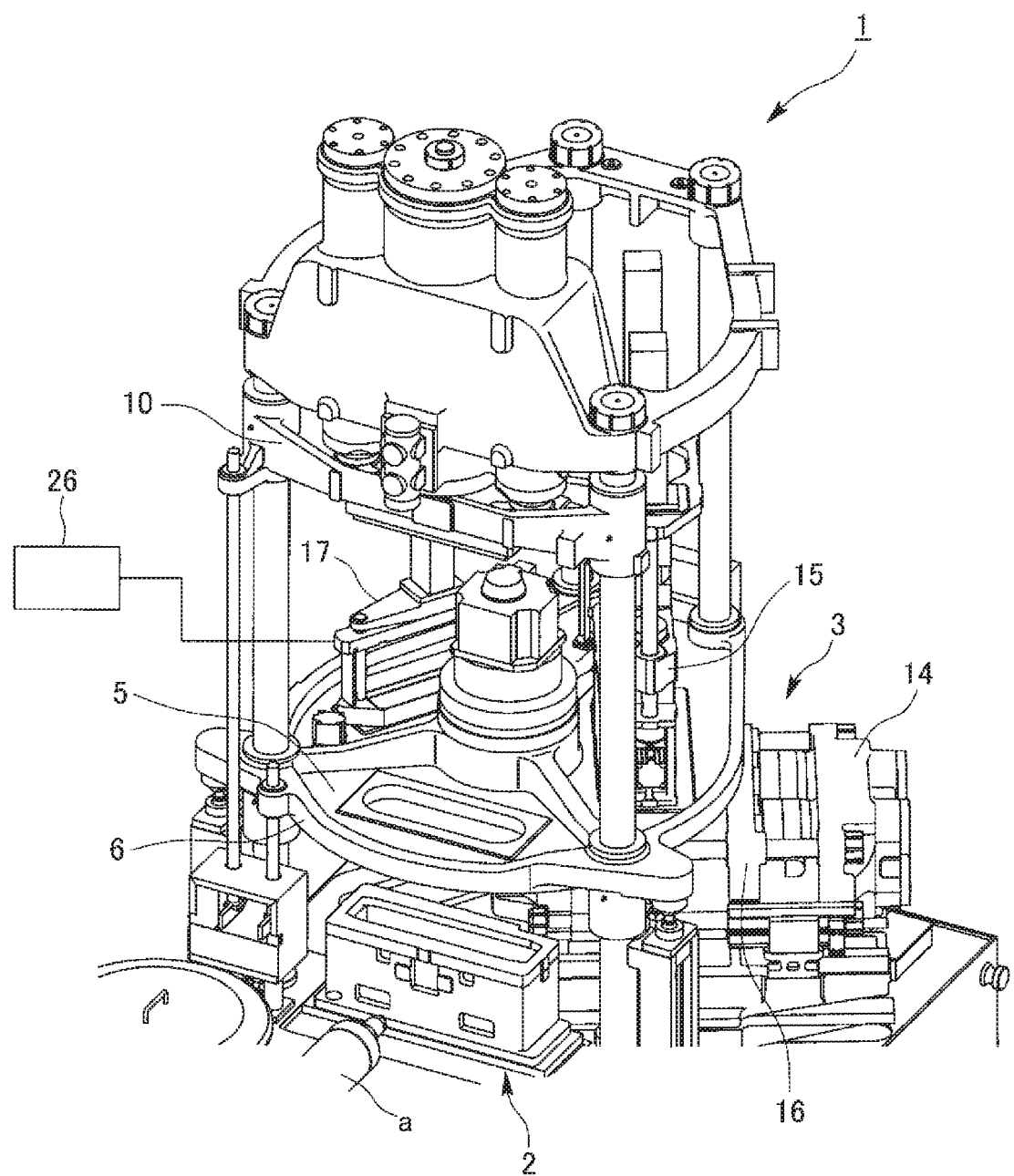
FIG. 1 is an explanatory diagram showing an embodiment of an injection stretch blow molding machine according to the present invention.

Next, the present invention will be described in detail on the basis of an embodiment shown in FIGS. 1 to 5. Incidentally, the portions having the same configurations as those of the conventional example will be denoted by the same reference numerals, and descriptions thereof will be omitted.

Figure 6:
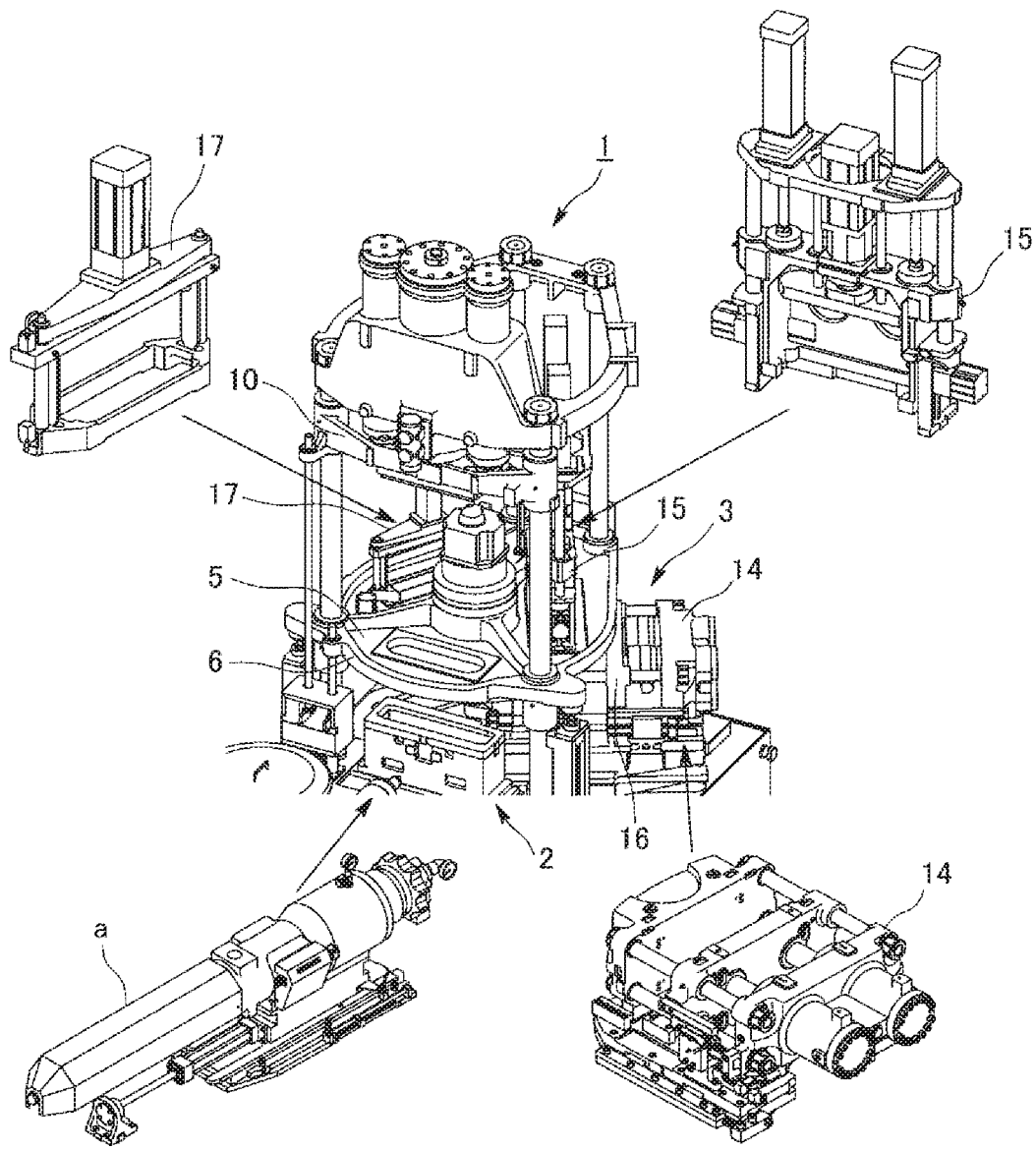
FIG. 6 is an explanatory diagram showing an example of a conventional injection stretch blow molding machine.
Figure 7:
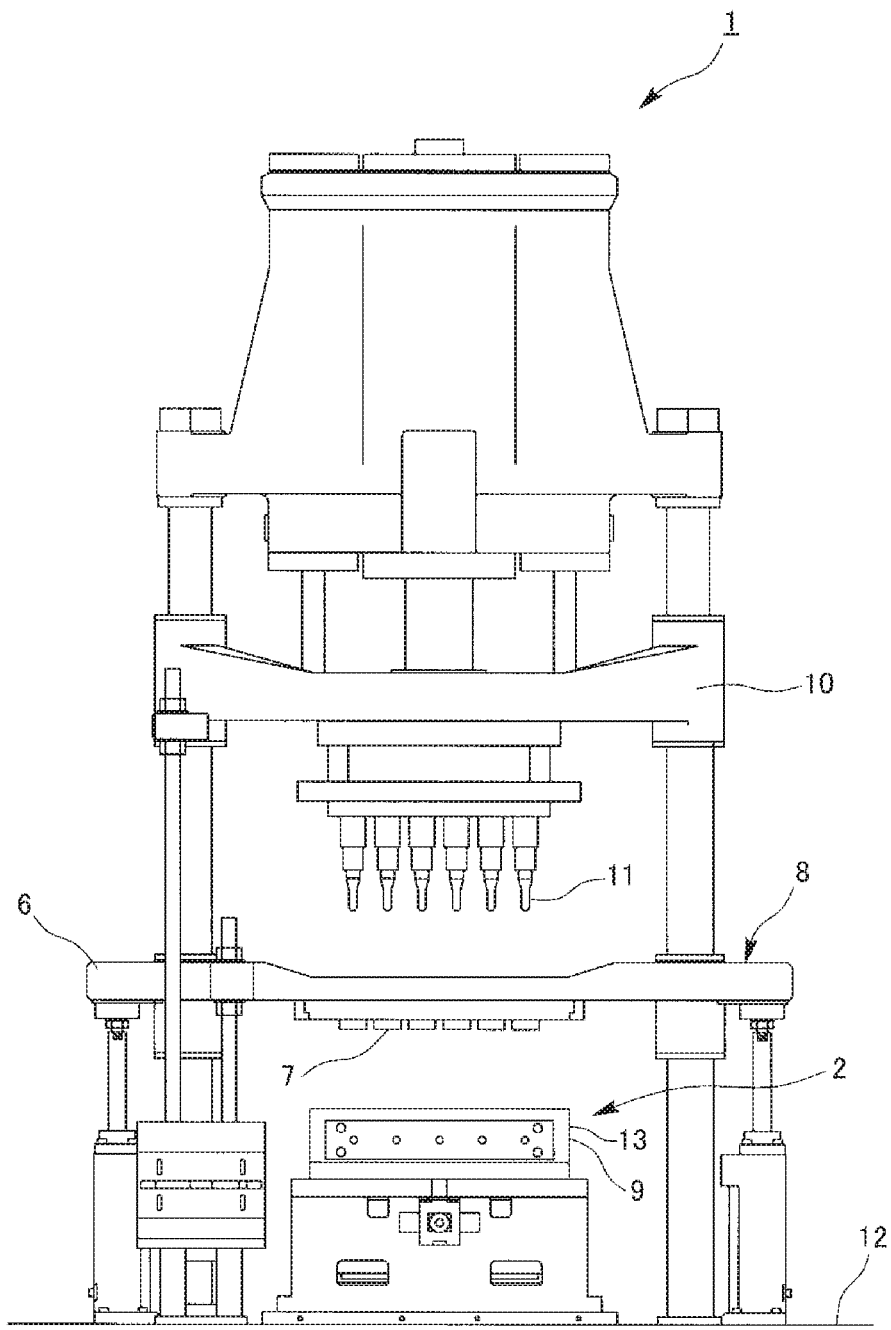
FIG. 7 is an explanatory diagram showing an example of an injection stretch blow molding machine when viewed from the side of the injection molding section.
Figure 8:
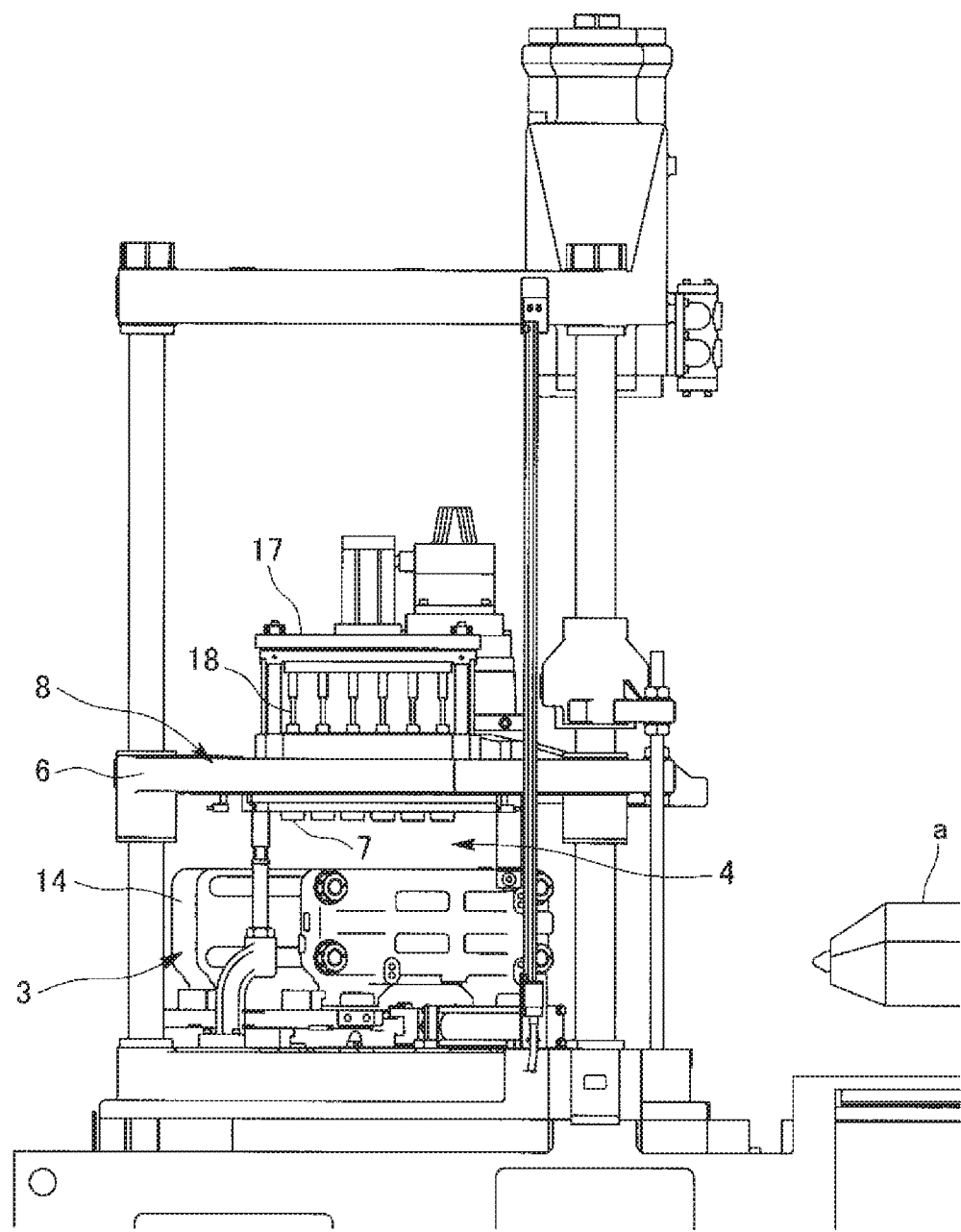
FIG. 8 is an explanatory diagram showing an example of the injection stretch blow molding machine when viewed from the side of the ejection section.
Figure 9:
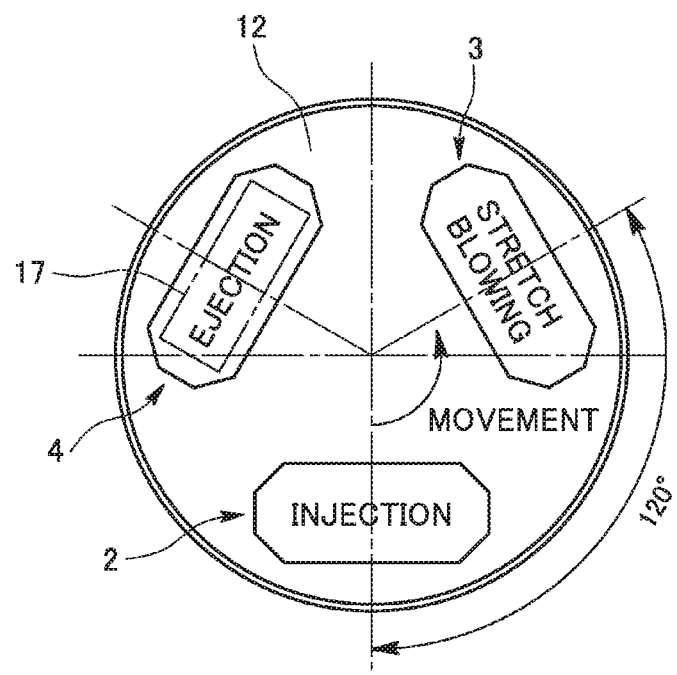
FIG. 9 is an explanatory diagram schematically showing the layout of the injection molding section, the stretch blow molding section, and the ejection section.
Figure 10:
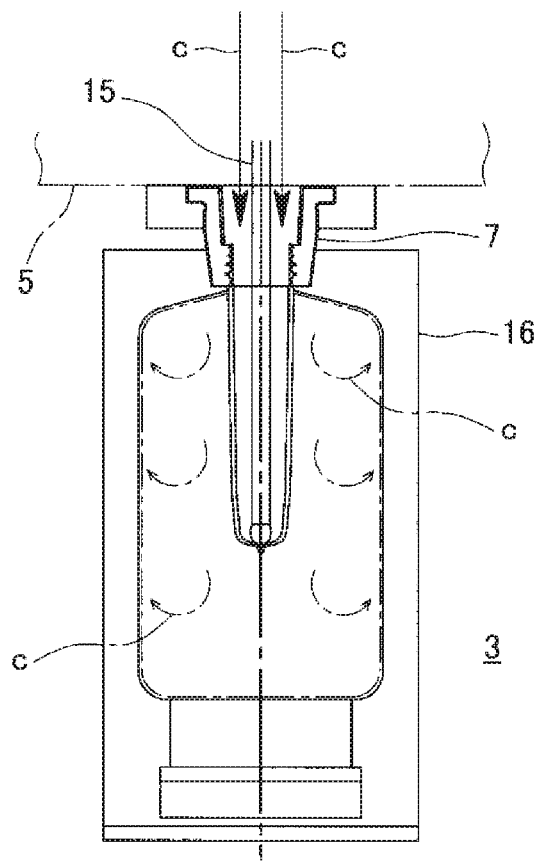
FIG. 10 is an explanatory diagram schematically showing the blow molding.
Figure 11:
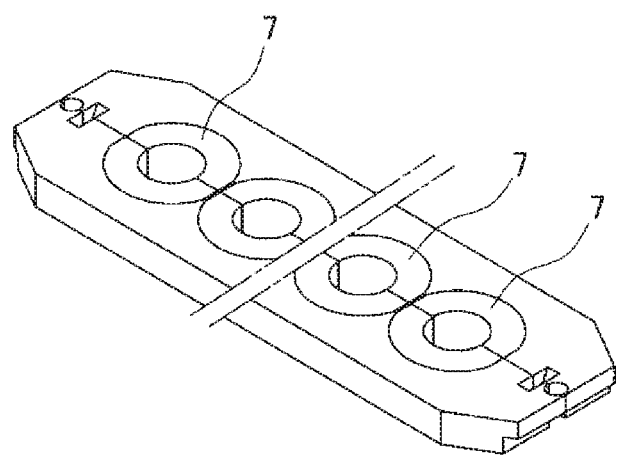
FIG. 11 is an explanatory diagram showing a lip mold.
Figure 12:
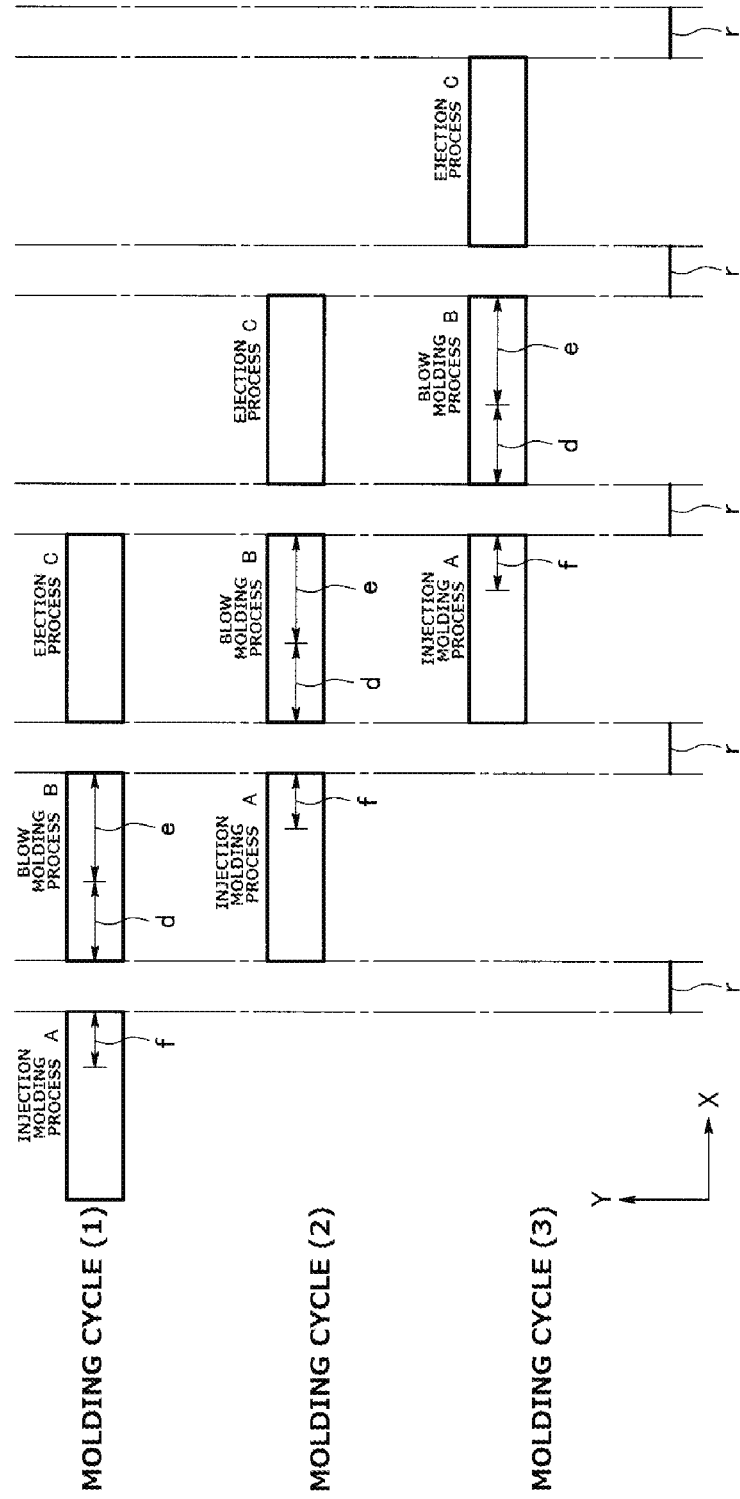
FIG. 12 is an explanatory diagram showing the process progress of each molding cycle in a conventional injection stretch blow molding machine.
Figure 13:
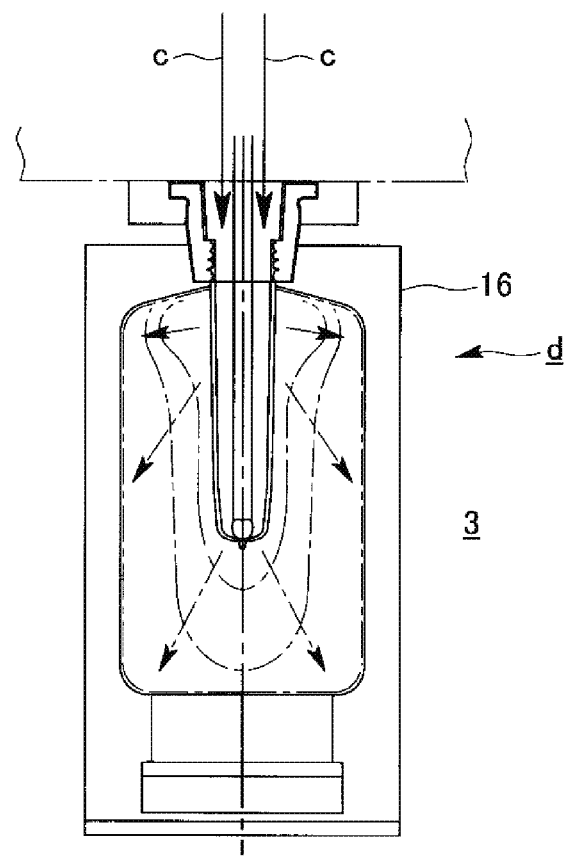
FIG. 13 is an explanatory diagram schematically showing an inflating stage in the blow molding.
Figure 14:
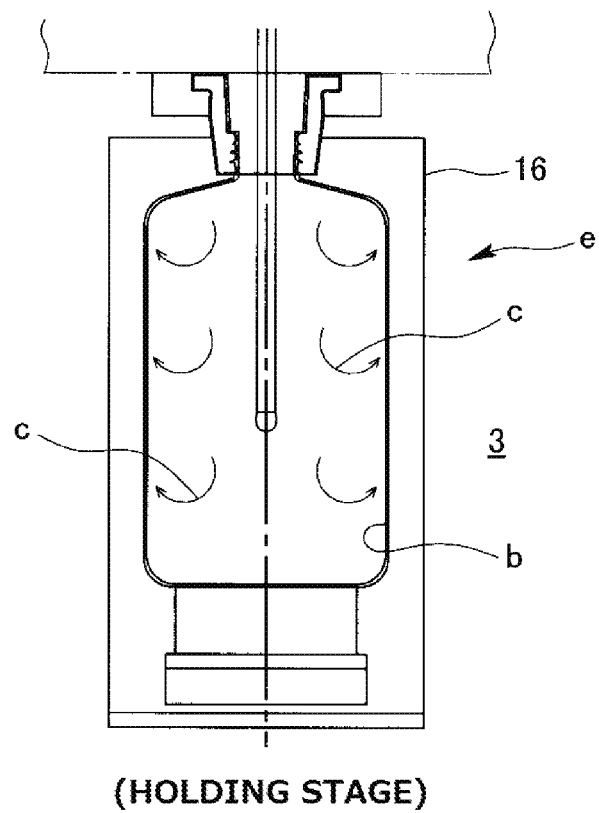
FIG. 14 is an explanatory diagram schematically showing a holding stage in the blow molding.

Injection Stretch Blow Molding Machine:

As shown in FIG. 6 similarly to the conventional injection stretch blow molding machine, the injection stretch blow molding machine 1 of the present invention includes an injection molding section 2, a stretch blow molding section 3, and an ejection section 4 disposed below a rotating plate 5 which stops and ascends and descends at every rotation angle of 120 degrees and around a rotation center axis of the rotating plate 5. The injection molding section 2, the stretch blow molding section 3, and the ejection section 4 are disposed on a lower base 12 at intervals of 120 degrees around the rotation center axis of the rotating plate 5.

Like the conventional injection stretch blow molding machine, the rotating plate 5 also has lip molds 7 for forming the outer peripheral surface of the mouth portion of a preform and also for conveying the preform on the lower surface thereof. The lip molds 7 are separated and disposed so as to be located at a rotation angle interval of 120 degrees around the rotation center axis of the rotating plate 5. (See FIG. 2)

The lip mold 7 corresponds to the injection molding section 2, the stretch blow molding section 3, and the ejection section 4 each time the rotating plate 5 rotates by 120 degrees and descends. In the injection molding section 2, an injection molding mold 9 is formed by the mold provided in the injection molding section 2 and the lip mold 7, and in the stretch blow molding section 3, a blow molding mold 16 is formed by the mold provided in the stretch blow molding section 3 and the lip mold 7. In the ejection section 4, the lip mold 7 corresponding to the ejection section 4 is opened to release the mouth portion of the hollow molded body, and the rod pushes out the hollow molded body to drop the same onto the slope and transfer it out of the machine.

The injection stretch blow molding machine 1 includes a molding cycle in which an injection molding process A, a blow molding process B, and an ejection process C proceed in this order, similarly to the conventional injection stretch blow molding machine, and the molding cycle is performed to manufacture a hollow molded body. Further, the process progress in the molding cycle is shifted by one step with respect to the process progress in a molding cycle next to the molding cycle, which is the same as the conventional example.

Ejection Section:

In the ejection section 4 of the injection stretch blow molding machine 1 of the present invention, a device for cooling, by using cooling air, the hollow molded body conveyed from the stretch blow molding section 3 on the upstream side in the rotation direction of the rotating plate and disposed in the ejection section 4 is provided.

Figure 2:
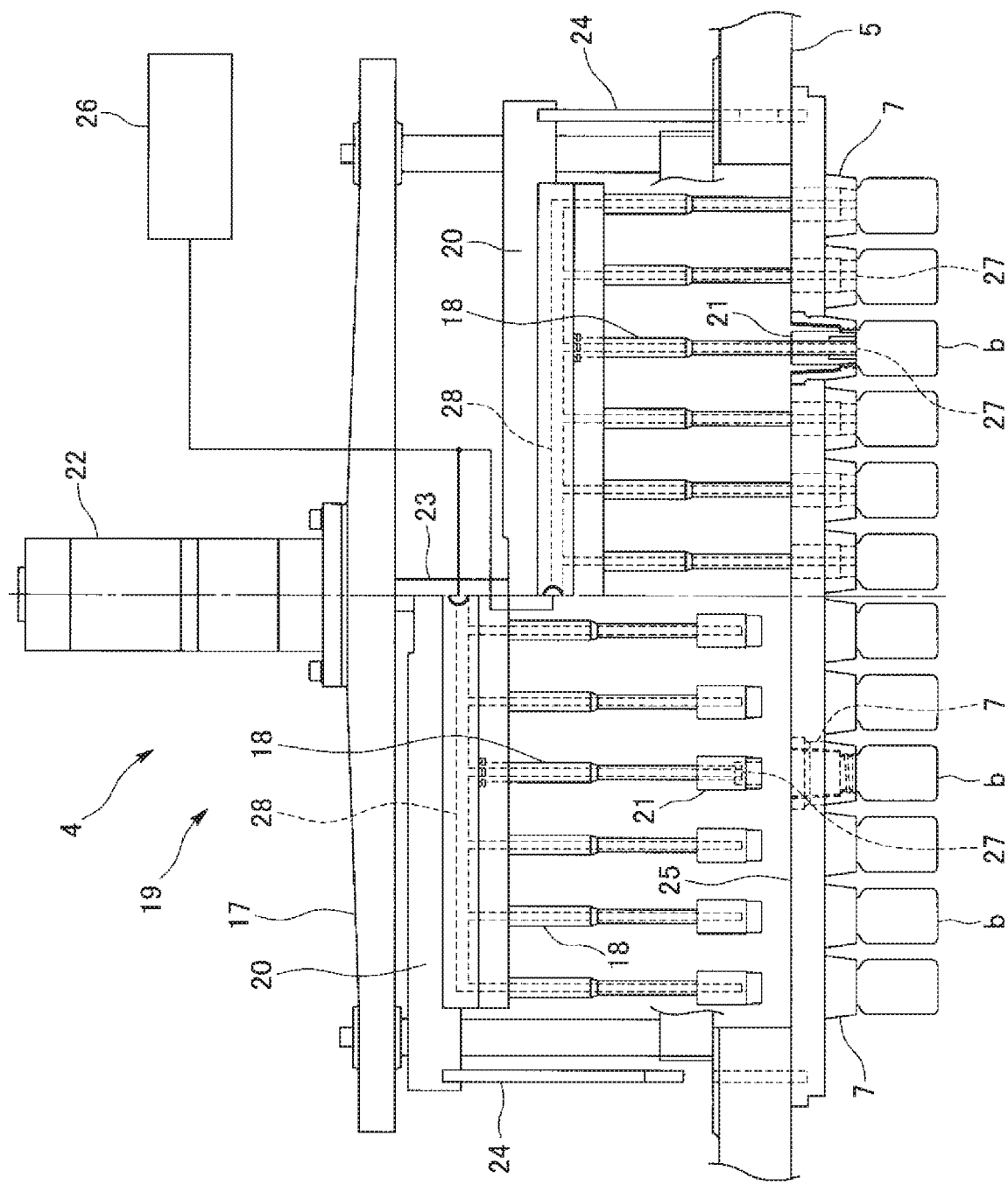
FIG. 2 is an explanatory diagram showing an example of an ejection section in the embodiment.
Figure 3:
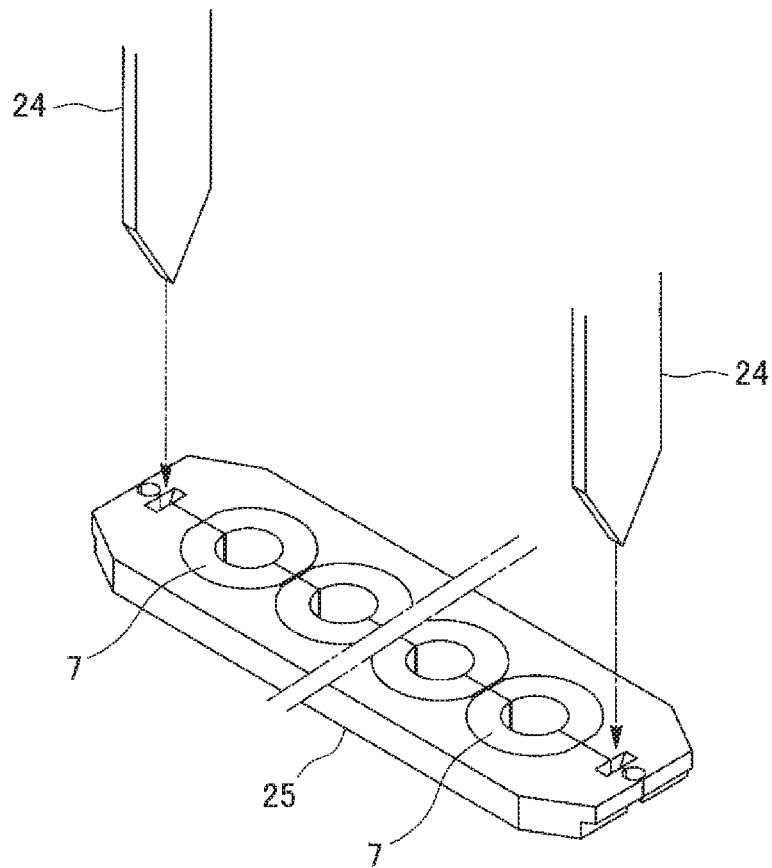
FIG. 3 is an explanatory diagram showing a lip mold in the embodiment.

FIG. 2 shows a pushing mechanism body 19 which is configured to lie above the slope of the ejection section 4. First, in the pushing mechanism body 19, the takeout unit 17 is assembled to the intermediate base 6. The pushing mechanism body 19 includes a base plate 20 to which upper ends of a plurality of pushing rods 18 are connected and by which the rods 18 are supported so as to hang down. The rod 18 is provided so as to be able to ascend and descend by the takeout unit 17 guiding the base plate 20 to ascend and descend.

The rod 18 itself is correspondingly positioned above the hollow molded body b located in the ejection section 4 so as to be capable of passing inside the lip mold 7 corresponding to the ejection section 4 and the mouth portion of the hollow molded body b held by the lip mold 7, as described in the description of the conventional injection stretch blow molding machine. When the rod 18 descends, the lower end of the rod 18 is positioned corresponding to the inside of the lip mold 7 and the mouth portion of the hollow molded body b. Further, when the rod 18 descends by a predetermined amount, as shown in the figure, an abutting member 21 attached around the outer circumference of the lower end of the rod 18 abuts against the mouth portion of the hollow molded body b, and functions to push the hollow molded body b downward.

In order to move the base plate 20 up and down, a cylinder device 22 is installed in the takeout unit 17. A shaft 23, which is provided in the cylinder device 22 so as to be able to move forward and backward, is connected to the base plate 20. The rod 18 ascends and descends under the operation of the cylinder device 22, and the lower end of the rod 18 is provided to stop temporarily at a set height position described later.

Opening of Lip Mold

Further, a lip mold opening plate 24 for opening the lip mold 7 is attached to each of the side end portions of the base plate 20. The opening of the lip mold 7 by the lip mold opening plate 24 and the movement of pushing the hollow molded body b by the descending rod 18 are associated with each other as follows.

The range of movement of the lower end of the rod 18 is from above the hollow molded body b of the ejection section 4 to the inside of the hollow molded body through the position of the mouth portion of the hollow molded body b. In FIG. 2, the left half shows a state where the rods 18 are in the standby position. The right half shows a state that the lower ends of the rods 18 are positioned while corresponding to the mouth portions of the hollow molded bodies b and being temporarily stopped.

First, the shaft 23 is extended downward by the operation of the cylinder device 22, and the base plate 20 and the rods 18 whose lower ends face the hollow molded bodies b above the hollow molded bodies b descend. When the lower ends of the rods 18 pass through the lip mold 7 and further descend to the height position of the mouth portions of the hollow molded bodies b, the descending of the rods 18 is temporarily stopped. In the temporarily stopped state, the lower ends of the rods 18 are positioned so as to face inward of the hollow molded bodies b. (See right half of FIG. 2)

When the base plate 20 is in the height position at which the rods 18 are temporarily stopped, the lip mold opening plate 24 attached to this base plate 20 does not reach the position of the pair of lip plates 25, each incorporating a half of the lip mold 7, and the lip mold 7 is in the closed state. (See FIG. 3)

When the base plate 20 and the rods 18 whose descending has been temporarily stopped descend again, the lower end of the lip mold opening plate 24 abuts against the abutting portion of the pair of lip plates 25, so that the pair of lip plates 25 is opened. When the pair of lip plates 25 is opened, the halves of the lip mold 7 are separated from each other so that the lip mold 7 is opened. The opening of the lip mold 7 releases the holding of the mouth portions of the hollow molded bodies b.

Further, when the rods 18 descend due to the descending base plate 20, the abutting members 21 abut against the mouth portions of the hollow molded bodies b to push the hollow molded bodies b downward. As a result, the hollow molded bodies b are detached from the lip mold 7.

When the hollow molded bodies b are detached, control is made so that the rods 18 ascend. As the base plate 20 ascends, the lip mold opening plate 24 upwardly moves away from the pair of lip plates 25 which are open, and the rods 18 upwardly moves so that the lower ends of the rods 18 exit the portions of the lip mold 7 upwardly, thereby returning to the standby position.

The lip plates 25 are provided with urging means (not shown) for urging the halves of the lip mold 7 so as to always abut against each other, and when the lip mold opening plate 24 upwardly moves away from the lip plates 25, the pair of lip plates 25 is closed, and the lip mold 7 in a state in which the halves abut against each other is formed, whereby the lip mold 7 returns to the closed state.

Cooling Device:

As shown in FIG. 2, a cooling device 26 is connected to the base plate 20 via a tube member. Then, a passage 28 is provided from the connecting portion of the tube member through the inside of the base plate 20 to each of the rods 18, and further through the inside of the rod 18 to a blow-out port 27 opened at the lower end of the rod 18. The passage 28 is a flow passage through which cooling air fed from the cooling device 26 flows, and the end of the flow passage is the blow-out port 27.

The cooling device 26 cools the hollow molded bodies b by feeding cooling air into the hollow molded bodies b disposed in the ejection section 4, and this cooling completes fixation of the container shape of the hollow molded bodies b.

As described above, the hollow molded bodies b that have moved from the stretch blow molding section 3 are disposed in the ejection section 4, the rods 18 of the pushing mechanism body 19 descend and the lower ends of the rods 18 enter the mouth portions of the hollow molded bodies b, and the lower ends of the rods 18 temporarily stop at the height position of the mouth portions of the hollow molded bodies b. When the descending of the rods 18 temporarily stops, the cooling device 26 feeds the cooling air.

At the time when the cooling device 26 feeds the cooling air, the blow-out port 27 is positioned so as to face the inside of the hollow molded body b. Cooling air is fed into the hollow molded bodies b from the blow-out ports 27 to cool the hollow molded bodies b, thereby completing solidification of the container shape. The cooling air fed into the hollow molded bodies b is discharged to the outside of the hollow molded bodies through a gap formed between the mouth portion of the hollow molded body b and the abutment member 21.

Before the rod 18 descends again, the cooling device 26 stops feeding the cooling air. After stopping the feeding of the cooling air, the above-mentioned opening of the lip mold 7 (release of the holding with respect to the mouth portions of the hollow molded bodies) and the pushing of the hollow molded bodies b by the abutment members 21 (detachment of the hollow molded bodies) are performed.

The cooling air enters the hollow molded bodies b and cools to a temperature at which the fixation of the container shape is completed. Then, the cooling device 26 blows cooling air from the blow-out ports 27 to the hollow molded bodies b positioned at the ejection section 4 from the stretch blow-molding section 3 at the latest by the end of the state in which the descending of the rods 18 is temporarily stopped. However, the stage of starting the feeding of cooling air does not need to be a point in time at which the descending of the rods 18 is temporarily stopped, as described above. It is also possible to feed cooling air when the rods 18 are positioned above the hollow molded bodies b.

As described above, the cooling air may be any cooling air as long as it enters the hollow molded bodies b and cools them to a temperature at which fixation of the container shape is completed. The temperature and the blowing pressure are not particularly limited.

As the temperature and the blowing pressure, for example, the temperature may be −30° C. and the pressure applied for blowing may be 1 MPa (mega pascal), and the temperature may be 30° C. and the pressure may be 2 2 MPa.

Manufacturing Method, Blow Molding Process:

In the injection stretch blow molding machine 1, a plurality of molding cycles are proceeding. The blowing operation of the cooling device 26 which blows cooling air in the ejection section 4 in the ejection process of the molding cycle is performed during the blow molding process in a next molding cycle subsequent to the molding cycle. This is important in the present invention.

Figure 4:
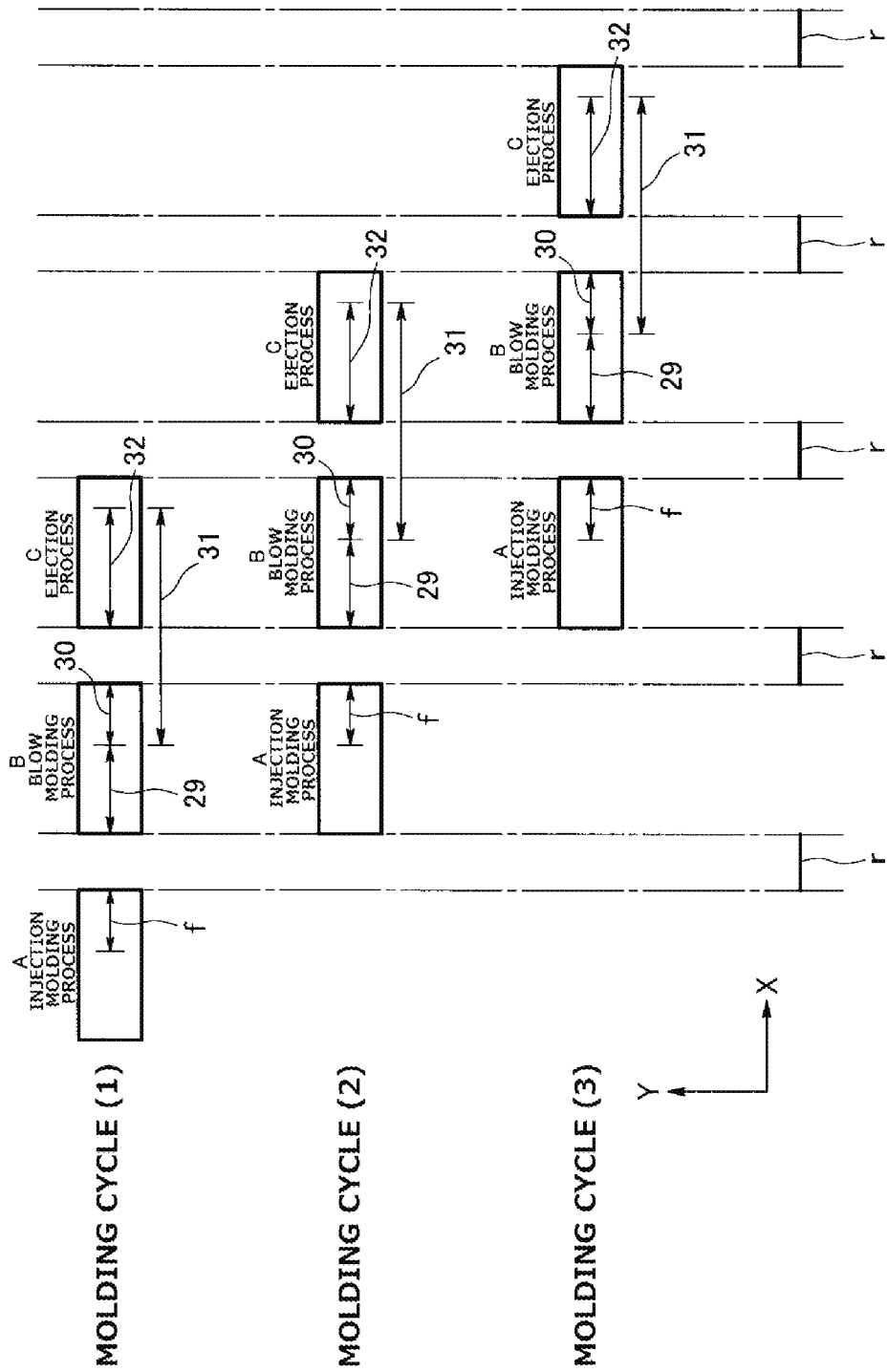
FIG. 4 is an explanatory diagram showing molding cycles in which one process is shifted and progressed in the present invention.

In the molding cycle of the injection stretch blow molding machine 1 of the present invention, as shown in FIG. 4, the injection molding process A, the blow molding process B, and the ejection process C proceed in this order. Further, the process progress in the molding cycle is shifted by one step with respect to the process progress in a molding cycle next to the molding cycle. Then, hollow molded bodies are manufactured for each molding cycle.

Also in the blow molding process in each molding cycle for manufacturing the hollow molded body b of the present invention, there are an inflating stage 29 in which blow molding blows blow air in the stretch blow molding section 3 to change the shape of the high-temperature, soft preform to a container shape, and a holding stage 30 in which blow air is continuously blown subsequent to the inflating stage to hold the hollow molded body in the blow molding mold. The inflating stage 29 and the holding stage 30 constitute the blow molding in the blow molding process.

The blow molding is constituted by the inflating stage 29 and the holding stage 30, which is the same as the point in the conventional example. However, in the method for manufacturing the hollow molded body in the above-mentioned conventional injection stretch blow molding machine, solidification of the container shape is completed in the holding stage. That is, solidification of the container shape of the hollow molded body is completed by the blow molding. Therefore, the time required for the blow molding is extended (i.e., the time required for the holding stage is long).

On the other hand, in the method of the present invention, the solidification of the container shape is not completed in the holding stage 30. That is, the hollow molded body b in the solidification incomplete state, which has not reached the completion of solidification of the container shape and whose container shape is stabilized, is molded by the blow molding mold. Then, the hollow molded body b in the solidification incomplete state which has undergone the blow molding process B is conveyed to the ejection section 4, and the ejection section 4 transfers the hollow molded body b to the ejection process C.

Solidification Period:

In the molding cycle of the method of the present invention, there is a solidification period 31 for solidifying the container shape in the hollow molded body from the holding stage 30 in the blow molding process B to the ejection process C in this molding cycle, as shown in FIG. 4.

The end of the solidification period 31 is a point in time at which the blowing of the cooling air by the cooling device 26 is completed. If the end of the blowing of the cooling air is the end of the temporal stop state of the rods 18, the end of the solidification period 31 is the end of the temporal stop state of the rods 18. In FIG. 4, reference numeral 32 denotes a cooling air blowing stage in which the cooling device 26 operates to blow cooling air.

In the solidification period 31 during the ejection process C, cooling air is blown into the hollow molded bodies b from the cooling device 26 as described above. Then, solidification of the container shape of the hollow molded bodies b is completed in the solidification period 31 in the ejection process C performed in the ejection section 4.

As described above, in the present invention, in the holding stage 30 in the solidification period 31 (during the blow molding process B), blow air is blown into the hollow molded bodies held by the blow molding mold to cool the hollow molded bodies, thereby obtaining the hollow molded bodies b in the solidification incomplete state. Further, in the ejection process C in the solidification period 31, the cooling air of the cooling device 26 is blown into the hollow molded bodies in the ejection section 4 to cool the hollow molded bodies, thereby completing solidification of the container shape.

In the present invention, in the blow molding using the blow molding mold, solidification of the container shape of the hollow molded bodies is not completed in the holding stage 30, so that the time required for the blow molding is shortened. Further, in the ejection process C, cooling air is forcibly blown to cool the hollow molded bodies until the solidification of the container shape is completed, so that it is easy to set the cooling time so as not to become long. On the contrary, it is also possible to secure a long cooling time within the time allocated to the ejection process C and within a range that does not affect the operation in the injection molding section or the stretch blow molding section.

Since the time required for blow molding can be shortened, shortening of the time allocated to the blow molding process B in the molding cycle can shorten the time allocated to the injection molding process A and the ejection process C (because the times required for the injection molding process A, the blow molding process B, and the ejection process C in the molding cycle are the same). Therefore, the molding cycle can be shortened, and the efficiency of manufacturing the hollow molded body can be improved.

In the above-described embodiment, the holding stage 30 in the blow molding performed by the stretch blow molding section 3 has been described as having blowing of blow air to perform cooling, but it is possible to perform blow molding in which cooling by blowing blow air is not performed in the holding stage 30. The hollow molded body whose shape has been changed to the container shape may be cooled by allowing it to come into contact with the blow molding mold, and the hollow molded body in a solidification incomplete state may be blow-molded.

Figure 5:
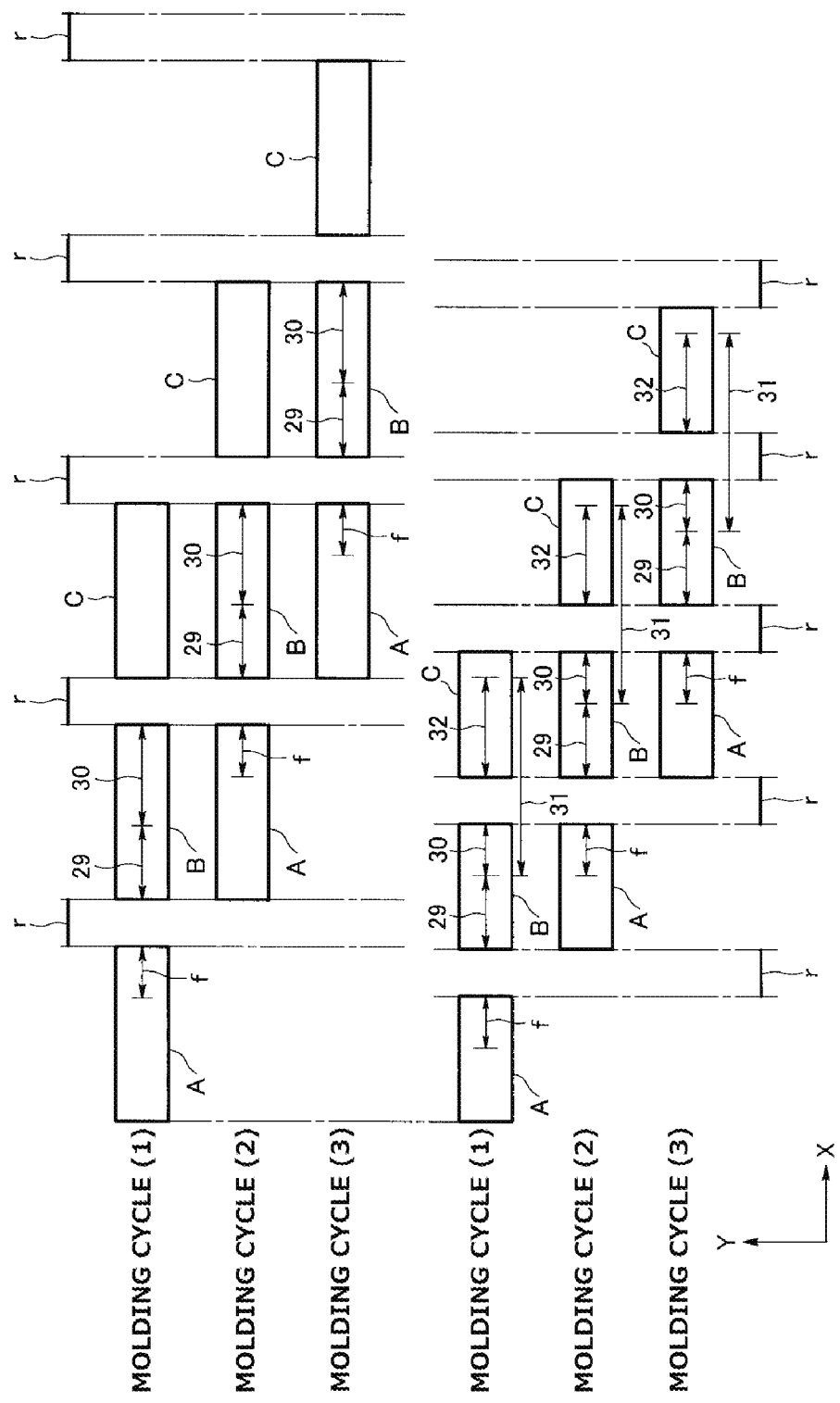
FIG. 5 is an explanatory diagram showing the process progress of the molding cycle in a conventional manufacturing method and the process progress of the molding cycle in the manufacturing method of the present invention.

FIG. 5 schematically shows a state in which the progress of the molding cycle in the conventional manufacturing method and the progress of the molding cycle in the manufacturing method of the present invention are disposed vertically for comparison. As shown in FIG. 5, since the molding cycle in the manufacturing method of the present invention is shortened, the manufacturing efficiency of the hollow molded body is improved as compared with the conventional technique.

REFERENCE SIGNS LIST

1 . . . Injection stretch blow molding machine
2 . . . Injection molding section
3 . . . Stretch blow molding section
4 . . . Ejection section
5 . . . Rotating plate
7 . . . Lip mold
17 . . . Ejection unit
18 . . . Rod
19 . . . Pushing mechanism body
20 . . . Base plate
21 . . . Abutment member
24 . . . Lip mold opening plate
26 . . . Cooling device
27 . . . Blow-out port
28 . . . Passage
29 . . . Inflating stage
30 . . . Holding stage
31 . . . Solidification period
A . . . Injection molding process B . . . Blow molding process
C . . . Ejection process
b . . . Hollow molded body

The invention claimed is:

1. An injection stretch blow molding machine in which an injection molding section, a stretch blow molding section, and an ejection section are provided around a rotation center axis of a rotating plate below the rotating plate having a lower surface to which lip molds for forming an outer peripheral surface of a mouth portion of a preform and for conveying a preform, the rotating plate being configured to stop at every constant rotation angle and ascend and descend, the lip molds corresponding to the injection molding section, the stretch blow molding section, and the ejection section every time the rotating plate rotates at the constant rotation angle and descends, the injection stretch blow molding machine comprising a cooling device capable of blowing cooling into an inside of a hollow molded body which is disposed in the ejection section and whose mouth portion is held by the lip mold, where the cooling device is configured to blow cooling air into the inside of the hollow molded body disposed in the ejection section to cool the hollow molded body disposed in the ejection section to complete fixation of a container shape, the ejection section is provided with a pushing mechanism body, the pushing mechanism body has a rod movable in a vertical direction corresponding to the mouth portion of the hollow molded body disposed in the ejection section, a movement range of a lower end of the rod is set to a range from above the hollow molded body disposed in the ejection section through a position of the mouth portion of the hollow molded body to the inside of the hollow molded body, when the lower end of the rod reaches the position of the mouth portion of the hollow molded body from above the hollow molded body, descending of the rod is temporarily stopped, the lip mold is opened to release holding of the mouth portion of the hollow molded body by the lip mold at the time of descending of the rod after the temporal stop, and the hollow molded body whose holding by the lip mold is released is pushed downward, the rod of the pushing mechanism body is provided with a passage through which cooling air of the cooling device passes with a blow-out port located at the lower end of the rod, and the cooling device blows cooling air from the blow-out port to the inside of the hollow molded body at the latest by the temporal stop of the descending rod.

2. The injection stretch blow molding machine of claim 1, wherein the blow molding of the stretch blow molding section includes an inflating stage of inflating the preform by blowing blow air to form a hollow molded body in a container shape, and a holding stage of holding the hollow molded body subsequent to the inflating stage, and the stretch blow molding section cools the hollow molded body as a pretreatment of the cooling of the hollow molded body by the cooling device in the holding stage in the blow molding.

3. A method for manufacturing a hollow molded body by an injection stretch blow molding machine in which an injection molding section, a stretch blow molding section, and an ejection section are provided around a rotation center axis of a rotating plate below the rotating plate having a lower surface to which lip molds for forming an outer peripheral surface of a mouth portion of a preform and for conveying a preform, the rotating plate being configured to stop at every constant rotation angle and ascend and descend, the lip molds corresponding to the injection molding section, the stretch blow molding section, and the ejection section every time the rotating plate rotates at the constant rotation angle and descends, so that an injection molding mold is formed in the injection molding section by a mold provided in the injection molding section and a lip mold and a blow molding mold is formed in the stretch blow molding section by a mold provided in the stretch blow molding section and a lip mold, the injection stretch blow molding machine having a molding cycle including:

an injection molding process in which the preform is injection molded in the injection molding section corresponding to the lip mold;

a blow molding process in which the lip mold holding a high-temperature, soft preform having been injection molded in the injection molding section moves and corresponds to the stretch blow molding section, the lip mold corresponding to the stretch blow molding section disposes the preform in the stretch blow molding section, and a hollow molded body in a container shape is blow-molded by blowing blow air into the preform;

an ejection process in which the lip mold holding the hollow molded body having been blow-molded in the stretch blow molding section moves and corresponds to the ejection section, the lip mold corresponding to the ejection section disposes the hollow molded body in the ejection section, and the lip mold corresponding to the ejection section opens to release the hollow molded body therefrom, which processes are sequentially performed, a process progress in the molding cycle being shifted by one step from a process progress in a molding cycle next to the molding cycle, where the injection stretch blow molding machine has a cooling device capable of blowing cooling air into an inside of the hollow molded body which is disposed in the ejection section and whose mouth portion is held by the lip mold, and the cooling device blows cooling air into the inside of the hollow molded body disposed in the ejection section during a blow molding process in the next molding cycle to cool the hollow molded body to solidify the container shape of the hollow molded body, wherein the ejection section is provided with a pushing mechanism body, the pushing mechanism body has a rod movable in a vertical direction corresponding to the mouth portion of the hollow molded body disposed in the ejection section, a movement range of a lower end of the rod is set to a range from above the hollow molded body disposed in the ejection section through a position of the mouth portion of the hollow molded body to the inside of the hollow molded body, when the lower end of the rod reaches the position of the mouth portion of the hollow molded body from above the hollow molded body, descending of the rod is temporarily stopped, the lip mold is opened to release holding of the mouth portion of the hollow molded body by the lip mold at the time of descending of the rod after the temporal stop, and the hollow molded body whose holding by the lip mold is released is pushed downward, the rod of the pushing mechanism body is provided with a passage through which cooling air of the cooling device passes with a blow-out port located at the lower end of the rod, and the cooling device blows cooling air from the blow-out port to the inside of the hollow molded body at the latest by the temporal stop of the descending rod.

4. The method for manufacturing a hollow molded body of claim 3, wherein the blow molding process includes an inflating stage of inflating the preform within a mold of the blow molding mold by blowing blow air to form a hollow molded body in a container shape, and a holding stage of holding the hollow molded body in the blow molding mold subsequent to the inflating stage, the molding cycle is provided with a solidification period of solidifying the container shape in the hollow molded body from the holding stage in the blow molding process to the ejection process in the molding cycle, and in the holding stage in the solidification period, blow air is blown into the hollow molded body held by the blow molding mold to cool the hollow molded body, and in the ejection process in the solidification period, cooling air of the cooling device is blown into the hollow molded body disposed in the ejection section to cool the hollow molded body, thereby completing solidification of the hollow molded body in the solidification period.

* * * * *